Feb. 13, 1923.　　　　　　　　　　　　　　　　　1,445,089.
P. J. KELLEY.
TROLLEY GUARD AND FINDER.
FILED OCT. 23, 1922.
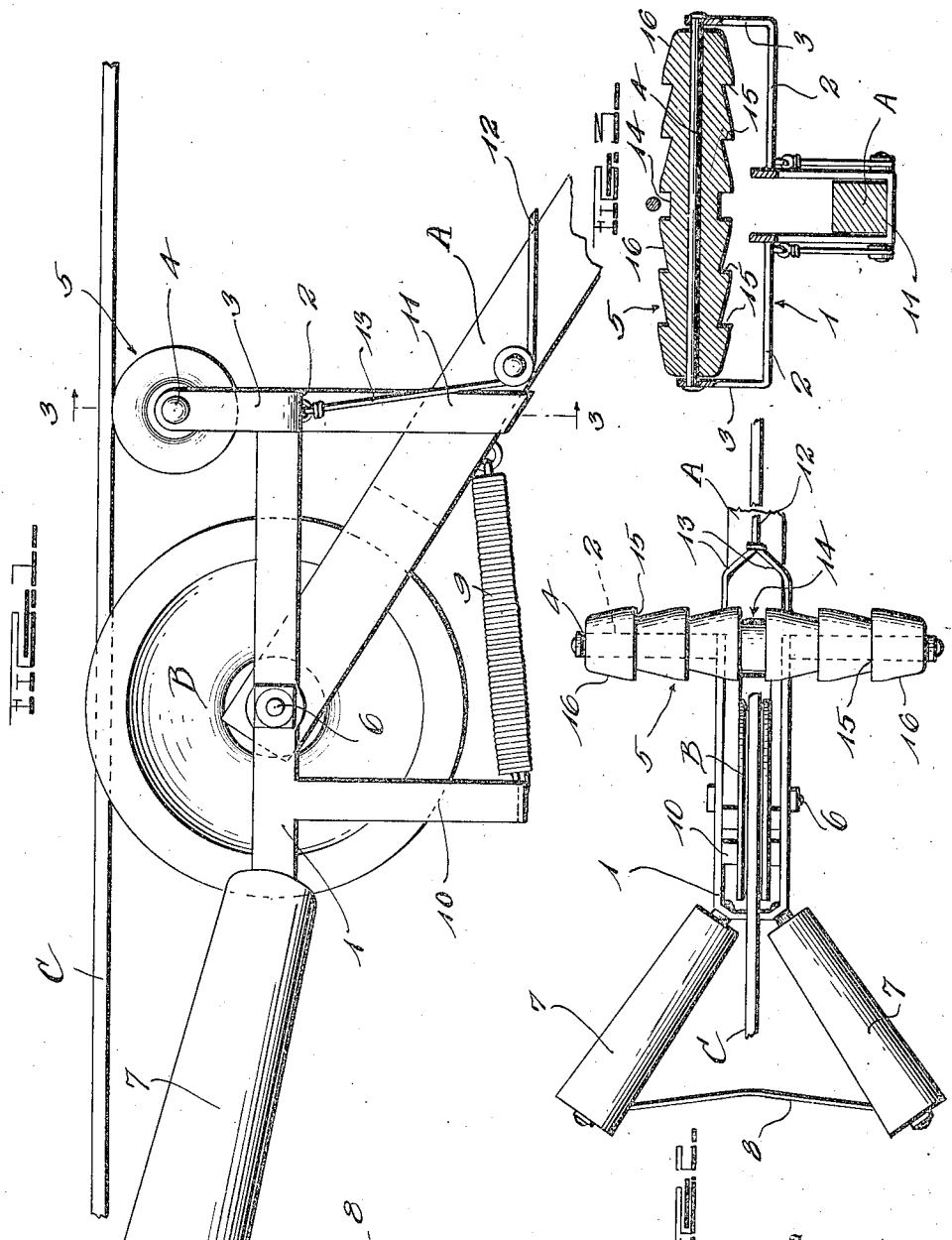
Inventor
P. J. Kelley Patented Feb. 13, 1923.

1,445,089

UNITED STATES PATENT OFFICE.

PATRICK J. KELLEY, OF DETROIT, MICHIGAN.

TROLLEY GUARD AND FINDER.

Application filed October 23, 1922. Serial No. 596,375.

*To all whom it may concern:*

Be it known that I, PATRICK J. KELLEY, a citizen of the United States, residing at Detroit, in the county of Wayne and State of Michigan, have invented certain new and useful Improvements in Trolley Guards and Finders; and I do declare the following to be a full, clear, and exact description of the invention, such as will enable others skilled in the art to which it appertains to make and use the same.

My invention relates to improvements in trolley guards and finders of the type disclosed in my U. S. Patent No. 1,391,191, of September 20, 1921. In the patented device, a pivoted frame mounted on the upper end of the trolley pole, carried a pair of conical smooth-surfaced rollers at its front end and a pair of finding rollers at its rear end, but I have found that the smooth-surfaced guard rollers had a tendency to slip from the wire in case the trolley wheel should jump. It is, therefore, the object of the present invention to provide an improved roller construction which will overcome the difficulty previously encountered.

With the foregoing in view, the invention resides in the novel subject matter hereinafter described and claimed, the description being supplemented by the accompanying drawing;

Fig. 1 is a side elevation showing the application of my invention to a trolley pole and wheel.

Fig. 2 is a top plan view of the parts shown in Fig. 1.

Fig. 3 is a vertical transverse section, as indicated by line 3—3 of Fig. 1.

In the drawing above briefly described, the numeral 1 designates a frame which is preferably of substantially U-shape in plan view, the sides of the frame being provided with outwardly extending arms 2 having upwardly turned outer ends 3, between which a shaft 4 extends for mounting a transverse guard roller 5 which is positioned in front of the trolley wheel B, the latter being carried by the usual trolley pole A to which the frame is pivoted, as indicated at 6.

The rear end of the frame 1 carries a pair of rearwardly diverged finding rollers 7 whose shafts are preferably connected at their rear ends by a suitable brace 8. A coil spring 9 connects a depending arm 10 of the frame 1 with the trolley pole A and serves to hold the frame in a normally horizontal position, the movement of said frame under the influence of the spring being limited by a suitable stop 11. When the parts are in this position, the finding rollers 7 are below the trolley wire C and the central portion of the guard roller 8 is spaced slightly below the wire C as shown in Fig. 3, in readiness to engage the wire in case the trolley wheel B should jump. Then, by means of a suitable cable or rope 12 having a bifurcated end 13 secured to the frame 1, said frame may be rocked against the action of the spring 9, thereby bringing the finding rollers 7 upwardly at opposite sides of the wire C to again guide the latter into the peripheral groove of the wheel B.

All of the parts above described are disclosed in my prior patent, above referred to, with the exception that in place of the roller 5, a pair of conical rollers are provided. The novel construction of the roller 5, it will therefore be seen, constitutes the gist of the present invention. This roller is provided with a central circumferentially extending groove 14 normally disposed under the trolley wire C, as shown in Fig. 3. The two halves of the roller are provided with a plurality of circumferential stop shoulders 15 which face inwardly and are disposed at right angles to the roller axis. From the groove 14 to the next adjacent shoulder and from each shoulder to the next shoulder, the periphery of the roller 5 is tapered, as indicated at 16. By employing this construction, whenever the trolley wheel jumps from the wire, this wire will be caught against one of the shoulders 15 and hence there is no liability of the roller and wire being disengaged and permitting the trolley pole to be thrown into the air, under the action of the usual springs. By employing the central groove 14, the roller 5 may be disposed in extremely close relation to the trolley wire, yet will not strike said wire unless the trolley wheel becomes disengaged therefrom.

From the foregoing it will be seen that a distinct improvement has been provided over the construction of my prior patent.

I claim:

1. A combined guard and finder for car trolleys, comprising a frame for pivotal mounting on the trolley pole, diverging finders carried by said frame for disposition in rear of the trolley wheel, and a transverse guard roller carried by said frame for location ahead of the trolley wheel, said roller having inwardly facing shoulders around its circumference between its center and ends, the periphery of said roller being outwardly tapered from said center to each of the adjacent shoulders and from each shoulder to the next.

2. A combined guard and finder for car trolleys, comprising a frame for pivotal mounting on the trolley pole, diverging finders carried by said frame for disposition in rear of the trolley wheel, and a transverse guard roller carried by said frame for location ahead of the trolley wheel, said roller having a central groove around its circumference and being provided between said groove and the ends of the roller with inwardly facing circumferential shoulders, the periphery of the roller being tapered toward each end from said groove to the next adjacent shoulder and from each shoulder to the next shoulder.

In testimony whereof I have hereunto affixed my signature.

PATRICK J. KELLEY.